(12) United States Patent
Thielman et al.

(10) Patent No.: US 7,571,855 B2
(45) Date of Patent: Aug. 11, 2009

(54) DISPLAY WITH SYMBOLOGY

(75) Inventors: Jeffrey Thielman, Corvallis, OR (US);
Shane Shivji, Corvallis, OR (US);
Michael M. Blythe, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 11/092,534

(22) Filed: Mar. 29, 2005

(65) Prior Publication Data

US 2006/0219788 A1 Oct. 5, 2006

(51) Int. Cl.
*G06K 7/10* (2006.01)
(52) U.S. Cl. ............. 235/462.01; 382/101; 324/207.17; 463/16; 463/36
(58) Field of Classification Search ............ 235/462.01, 235/386; 382/101; 324/207.17; 463/16, 463/36; 705/12
See application file for complete search history.

(56) References Cited

U.S. PATENT DOCUMENTS

| 5,606,374 | A | 2/1997 | Bertram |
| 6,152,371 | A | 11/2000 | Schwartz et al. |
| 6,690,156 | B1 | 2/2004 | Weiner et al. |
| 6,710,770 | B2 | 3/2004 | Tomasi et al. |
| 6,778,683 | B1 | 8/2004 | Bonner et al. |
| 2005/0064936 | A1* | 3/2005 | Pryor .......................... 463/36 |
| 2005/0245307 | A1* | 11/2005 | Gatto et al. ................... 463/16 |
| 2006/0151621 | A1* | 7/2006 | Ladas et al. ................. 235/494 |

OTHER PUBLICATIONS

Wechter et al., Automatic Identification and Data Collection Technologies in the Transportation Industry, Center for Technology Innovation, 2001, pp. 1-16, vol. 1, No. 2.

* cited by examiner

*Primary Examiner*—Allyson N Trail

(57) ABSTRACT

In embodiments, data corresponding to an object is determined from symbology.

33 Claims, 4 Drawing Sheets

DISPLAY WITH SYMBOLOGY

BACKGROUND

The position of an item may be determined by a two-dimensional bar code scanner. For example, bar code scanners may be used to scan bar codes affixed to items of interest. When using bar codes, however, one may be unable to determine the item's orientation. Also, when bar codes are absent from the item, such techniques are not applicable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Techniques for utilizing a symbology proximate to a display are described. The symbology may be used to determine data corresponding to an object. The data may include information regarding the object's position and/or orientation. Hence, the object may be tracked as it moves over the display. In one embodiment, the object includes a sensor to read the symbology and logic to decode it. The symbology may also be transmitted to a decoding device (e.g., external to the object) to be decoded. In an embodiment, the symbology is projected by the display (e.g., for a temporary period) if the object is in proximity to the display.

Display with Symbology

Figure 1:
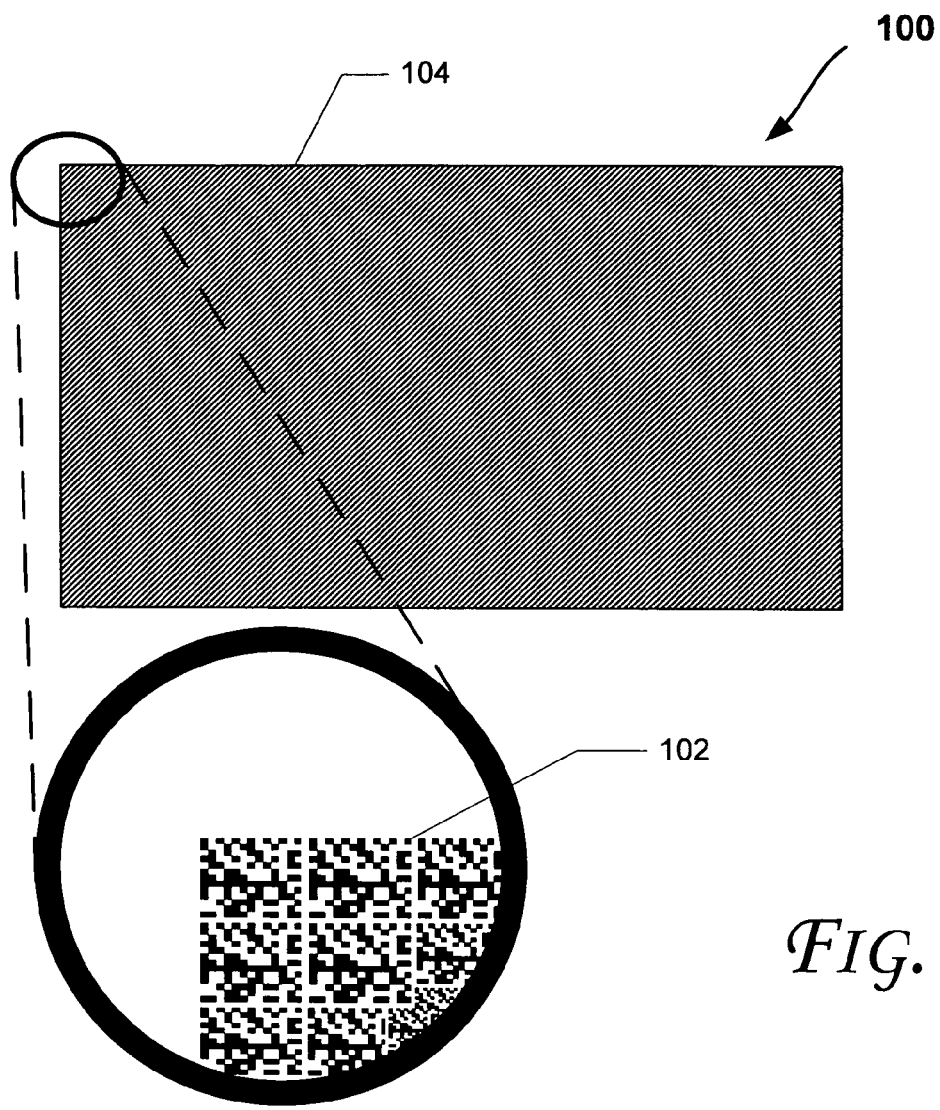
FIG. 1 illustrates an embodiment of a display system with symbology, according to an embodiment.

FIG. 1 illustrates an embodiment of a display system 100 with symbology, according to an embodiment. The display system 100 includes a symbology 102 that may be present in proximity to a display 104 (such as on the display 104). The symbology 102 may be a machine-readable symbology that includes data such as position information. The data may be utilized by an object to determine the objects position and/or orientation, as will be further discussed with reference to FIG. 3. For example, a 1 mm square array of markings could be provided on a 1 mm grid. Then, when a specific array of markings, e.g., encoded with two-dimensional position coordinates for the given location on the surface (x1, y1) is seen, an object will know that it is at position (x1, y1) and oriented to theta 1 degree (e.g., the relative heading of the object when compared with a reference point). In one embodiment, the symbology 102 may be used to determine the orientation of the object. For example, the object may read the symbology 102 and calculate the orientation of the object, as discussed further with respect to FIGS. 2A and 3.

As illustrated in FIG. 1, the symbology 102 may be encoded in a two-dimensional array of markings. The markings may be encoded with two-dimensional position coordinates for the given location on the surface (x1, y1) of the display 104. Also, the symbology 102 may be embossed, etched, machined, and/or printed on a display overlay (or on the display 104). Other embodiments could use other marking technologies as well. In one embodiment, the symbology is printed in ink such as infrared reflective ink and/or an ultraviolet fluorescing ink. Accordingly, the ink may be optically clear and capable of reflecting one or more spectrums of light rays including infrared and/or ultraviolet light rays. It is also envisioned that the symbology 102 may enable a user to view a video image. For example, the ink used may be gray and/or white that allows the electromagnetic energy to be seen on the (e.g., glass or plastic) surface of the display (104).

The display 104 may be a computer-controlled display device such as 420 discussed with reference to FIG. 4. Also, the symbology 102 may be projected if the object is proximate to the display for a temporary period. The temporary period may be a relatively short time period to allow a code-scanning machine (such as an optical scanner, one or more diodes, or a camera) to read the symbology, e.g., without obstructing the view of a user. Examples of temporary time periods may range from a few nanoseconds to a period that is less than 1/60 of a second. The camera may be any suitable camera including a charge-coupled device (CCD), complimentary metal-oxide semiconductor (CMOS) image sensor, and the like.

Projecting Symbology

Figure 2B:
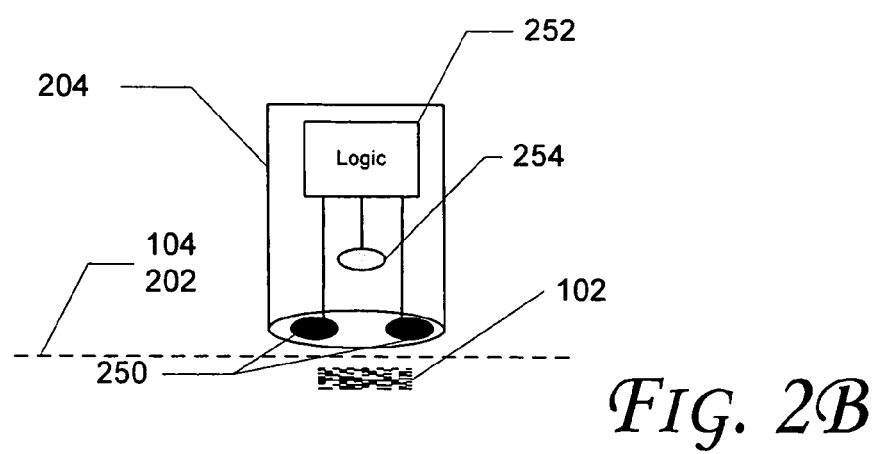
FIG. 2B illustrates an embodiment of a sample object, according to an embodiment.
Figure 2A:
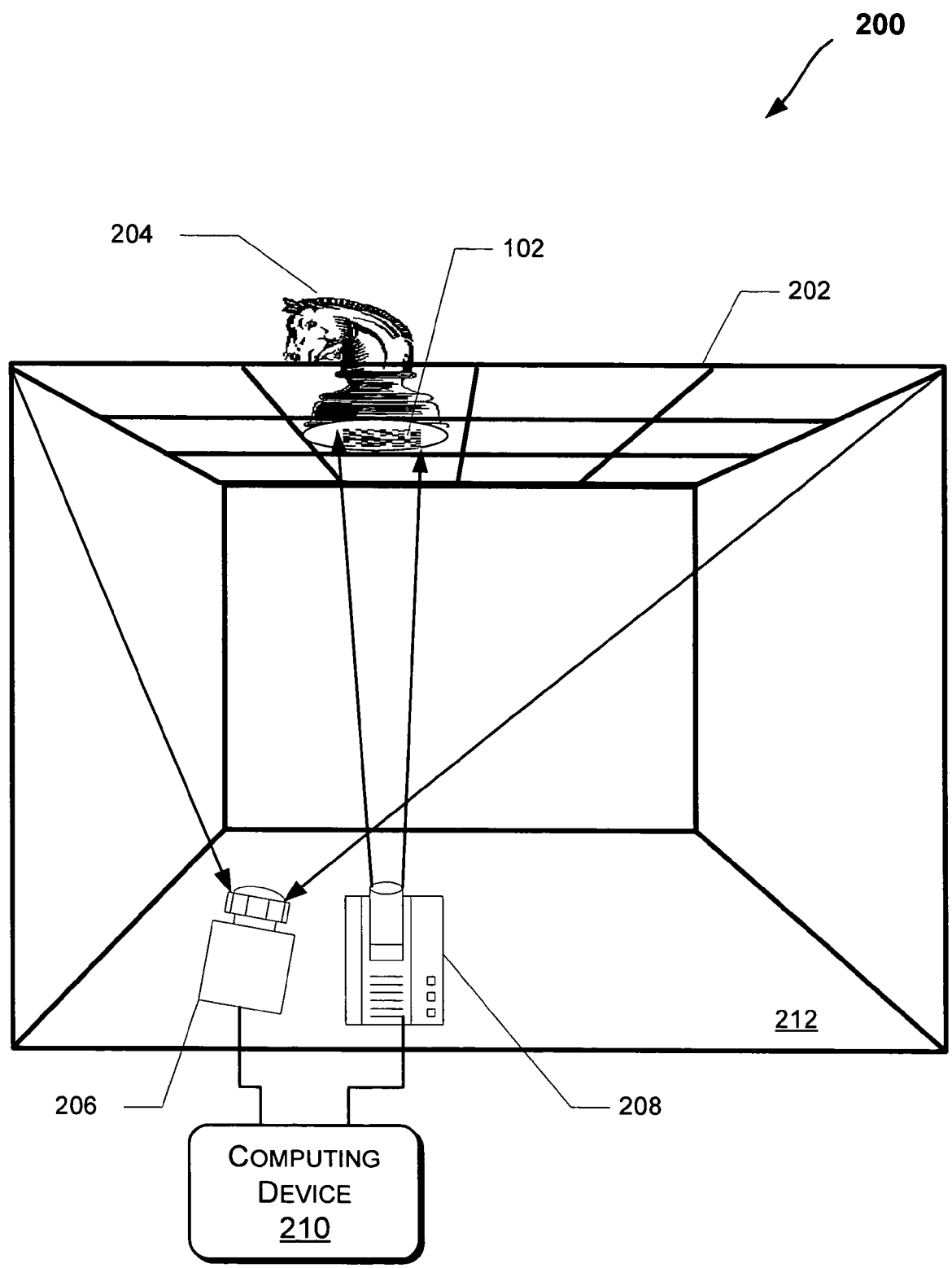
FIG. 2A illustrates an embodiment of a symbology projection system, according to an embodiment.

FIG. 2A illustrates an embodiment of a symbology projection system 200, according to an embodiment. The system 200 may be utilized to provide the symbology 102 discussed with reference to FIG. 1, in an embodiment. The system 200 includes a surface 202 which may be positioned substantially horizontally. The surface 202 may also be tilted for viewing from the sides, for example. In one embodiment, the surface 202 may be a display such as that discussed with reference to 104 of FIG. 1.

The system 200 recognizes an object 204 placed on the surface 202. The object 204 may be any suitable type of an object capable of being recognized such as a device, a token, a game piece, and the like. When the object 204 is placed on the surface 202, a camera 206 may capture an image of the surface 202. Hence, the surface 202 may be any suitable type of a translucent or semi-translucent surface (such as a projector screen) capable of supporting the object 204, while allowing electromagnetic waves to pass through the surface 202. Also, the object (204) may be placed on the surface (202), such that the object is located over the symbology. The camera 206 may be any suitable type of capture device such as a CCD sensor, a CMOS sensor, and the like.

In one implementation, the system 200 determines that changes have occurred with respect to the surface 202 (e.g., the object 204 is placed or moved) by comparing a newly captured image with a reference image that may have been captured at a reference time (e.g., when no objects were present on the surface 202).

The system 200 also includes a projector 208 to project images (such as the symbology 102) onto the surface 202. The camera 206 and the projector 208 are coupled to a computing device 210. The computing device 210 may control the camera 206 and/or the projector 208, e.g., to capture images of the surface 202 and/or project images onto the surface 202. In one embodiment, the computing device 210 may be the computing device 400 discussed with reference to FIG. 4.

Additionally, as illustrated in FIG. 2A, the surface 202, camera 206, and projector 208 may be part of an enclosure (212), e.g., to protect the parts from physical elements (such as dust, liquids, and the like) and/or to provide a sufficiently controlled environment for the camera 206 to be able to capture accurate images and/or for the projector 208 to project brighter images. Also, it is envisioned that the computing device 210 (such as a laptop) may be provided wholly or partially inside the enclosure 212, or wholly external to the enclosure 212.

In one embodiment, the symbology (102) may be projected (e.g., by projector 208 or the display 104 of FIG. 1) if the object (204) is in proximity to the display. The symbology 102 may be projected on the surface of the display (202 and/or 104) for a temporary period (e.g., ranging from a nanosecond to a fraction of a second).

FIG. 2B illustrates an embodiment of a sample object, according to an embodiment. As illustrated in FIG. 2B, the object (204) may have one or more sensors (250) such as photo diodes to receive data serially. In an embodiment, the symbology (102) may be projected on the surface of a display (104, 202) for a relatively long period, in short bursts or flashes. The object 204 also includes logic (252) that may be coupled to the one or more sensors 250 and/or a scanning light source 254. The scanning light source 254 may be any suitable light source to provide illumination for the sensors (250) to scan the symbology (102) present under the object (204), such as those discussed herein with respect to FIGS. 1, 2A, and 3. Also, the scanning light source 254 may provide light in wavelengths that are visible and/or non-visible to the unaided human eye. The logic 252 may provide hardware and/or software (e.g., embedded in hardware) to decode signals received from the one or more sensors (250). The logic 252 may also control the scanning light source 254 to provide illumination for the sensors (252) to read the symbology (102) present under the object (204). A single sensor (250) may be used to find the location of the object 204, e.g., by reading the two-dimensional position coordinates (e.g., encoded in the symbology 102) for the given location on the surface (x1, y1) of the display (104). Two sensors (250) may be used to find the location and/or the orientation of the object 204. For example, position data from a first sensor (x1, y1) may be compared with position data from a second sensor (x2, y2) to determine the relative heading of the object (204).

Furthermore, serial data may be sent using light not readily visible the unaided human eye and using any suitable display type. For example, the serial data may be sent between the computing device 210 and the object 204. The serial data may be sent for a relatively long period of time and may be periodically updating location data and/or sending other information. Additionally, once the location of the object (204) is determined, larger amounts of data (e.g., over longer periods) may be sent to the object (204) by projecting the symbology under the object (such that a user's view would not be obstructed). It is envisioned that projecting the symbology under the object 204 enables faster pulsing of the serial data (e.g., providing more data bandwidth), without obstructing a user's view.

Object Data Extraction

Figure 3:
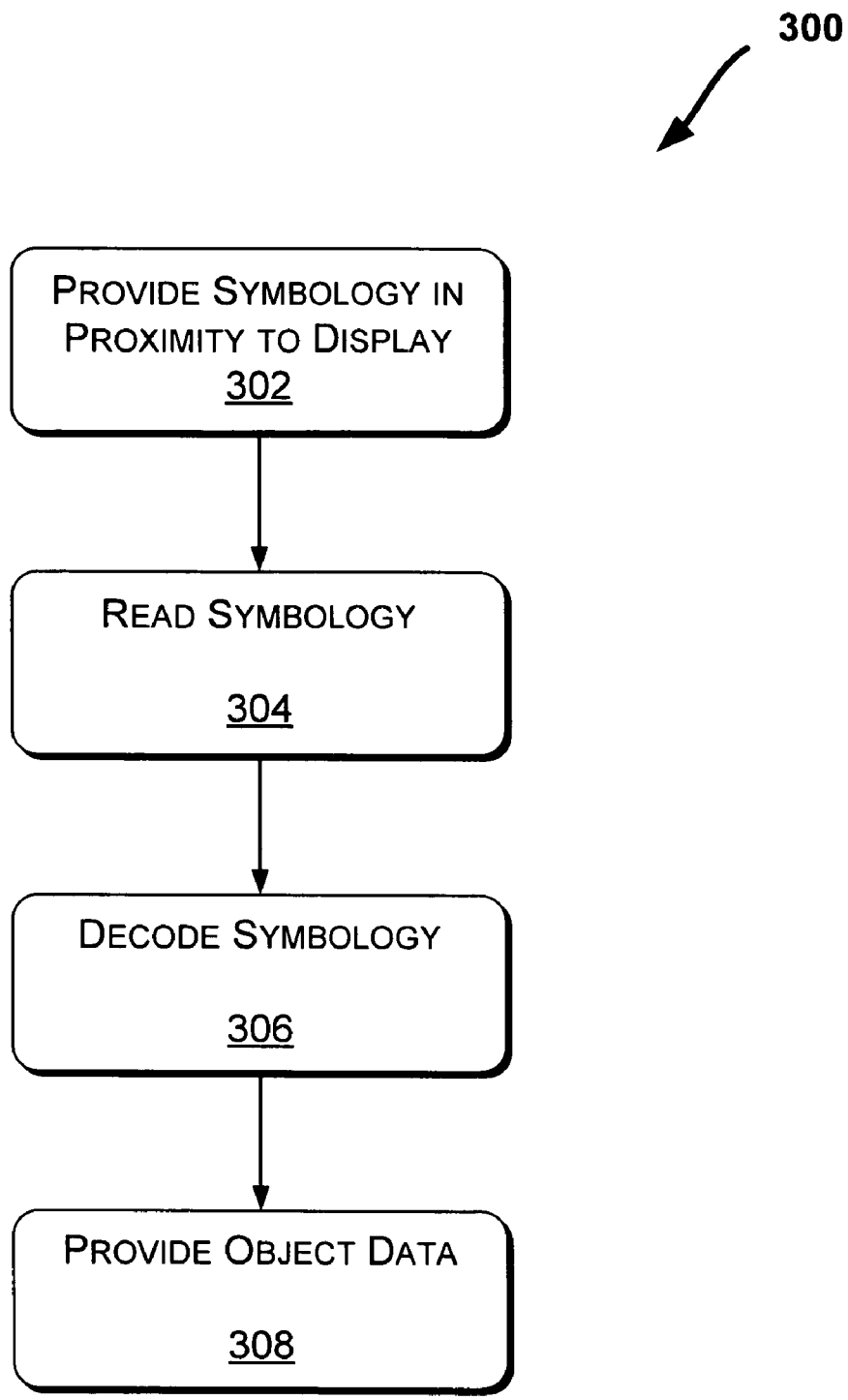
FIG. 3 illustrates an embodiment of a method of extracting data corresponding to an object from a symbology, according to an embodiment.

FIG. 3 illustrates an embodiment of a method 300 of extracting data corresponding to an object from a symbology, according to an embodiment. In one embodiment, the systems of FIGS. 1 and 2A can be utilized to perform the method 300. For example, a symbology (such as 102 of FIG. 1) may be provided (302) in proximity to a display (such as the display 104 of FIG. 1) or projected on a display (such as the display 104 of FIG. 1 and/or the surface 202 of FIG. 2A). The symbology (102) may be encrypted.

Additionally, the symbology may be optically clear, e.g., to enable a user to utilize the display without obstructing the images projected on the display. It is also envisioned that the symbology 102 may enable a user to view a video image. For example, the ink used may be gray and/or white to allow the electromagnetic energy to be seen on the (e.g., glass or plastic) surface of the display (104). The symbology may be provided on a display overlay (that is placed on the display (104)). The symbology may also be etched, embossed, machined, and/or printed on the display (104 of FIG. 1 or 202 of FIG. 2A), such as discussed with reference to FIGS. 1 and 2A. Hence, the symbology may be provided by one or more technique including, but not limited to, printing, etching, embossing, projecting, and/or machining. Other embodiments could use other marking technologies as well.

In one embodiment, the symbology (102) may be projected (e.g., by projector 208 of FIG. 2A or the display 104 of FIG. 1) if the object (204) is in proximity to the display, such as discussed with reference to FIG. 2A. The symbology may be projected by the display for a temporary period (e.g., ranging from a nanosecond to a fraction of a second).

As discussed with reference to FIG. 1, the symbology (102) may include data corresponding to the position and/or the orientation of the object (204). The object (204) may also include a light ray source, such as an infrared light source and/or an ultraviolet light source, to illuminate the symbology (102).

The object (204) may optionally include a sensor to read (304) the symbology (102). The sensor may be an optical navigation sensor, such as found in an optical mouse, which contains a relatively small (currently 900 pixel) digital camera. The optical sensor may take pictures at about 1,000 frames per second, so relatively small and fast movements of the object (204) may be tracked. Accordingly, the object (204) would read a surface (e.g., a display overlay, 104 of FIG. 1, and/or 202 of FIG. 2A) to determine the position and/or orientation of the object with respect to the display (104 of FIG. 1 or 202 of FIG. 2A). In one embodiment, the object utilizes a sensor with a resolution of about 50×50 pixels, which could capture a 10×10 two-dimensional marking oriented in any direction. The sensors may have an optical element that has a size equal to or greater than twice the width of the code diagonal provided on the surface of the display (104, 202). Also, the optical element may be made of pixels relatively smaller than the code pixels (e.g., ⅕ of the size). It is envisioned that a relatively accurate position may be determined by knowing the position of the object center relative to the symbology (102) on the surface of the display (104, 202).

The object (204) or its optical sensor may be coupled to a decoding device (such as logic embedded with the object) that decodes (306) the symbology (102), e.g., to determine the position and orientation data. It is also envisioned that the decoding may be performed external to the object (204), for example, by a computing device (such as 212 of FIG. 1). Hence, the object (204) may transmit the symbology (102) to a decoding device. Additionally, it is envisioned that objects may be positioned apart from a display. For example, the symbology may be provided (e.g., printed) on a game board and the processing may occur within the object (e.g., absolute position, position relative to other game pieces, orientation, or game rules).

The object data may then be provided (308). The object data may be extracted as a result of decoding the symbology (306) in one embodiment. As discussed with reference to the previous figures, the object data may include position and/or orientation data. In an embodiment, the object data may be transmitted to a computing device (e.g., 400 of FIG. 4) for further processing, for example in a game or other interactive environment. The object data may be transmitted via radio frequency (RF), infrared (IR), optical, and the like. Accordingly, in an embodiment, a symbology (102) in proximity to a display (104 of FIG. 1 or 202 of FIG. 2A) is utilized to determine data corresponding to an object (204 of FIG. 2A). Also, the orientation of the object (202) may be calculated by determining an angle between a sensor (within the object that reads the symbology 102) and the symbology (102) being read. For example, the symbology may include a horizontal line and/or a vertical line, such as a two-dimensional array of markings, and when the sensor reads the symbology (102), it would determine that the horizontal line, and thus the symbology, is theta degrees off from a reference orientation for which it was aligned with the horizontal line.

In one embodiment, the object data may be utilized to track movement of the object (204) in three dimensions. For example, a stretchable/compressive material may be used for a display surface (e.g., 104 of FIG. 1 and/or 202 of FIG. 2A), together with a relatively higher resolution camera, to determine a rise or fall in elevation, e.g., by determining the delta between the flat measured center point distances and the elevated center point distances. In an embodiment, the camera resolution may be about 1,000 times as high as for two-dimensional measurement.

Exemplary Computing Environment

Figure 4:
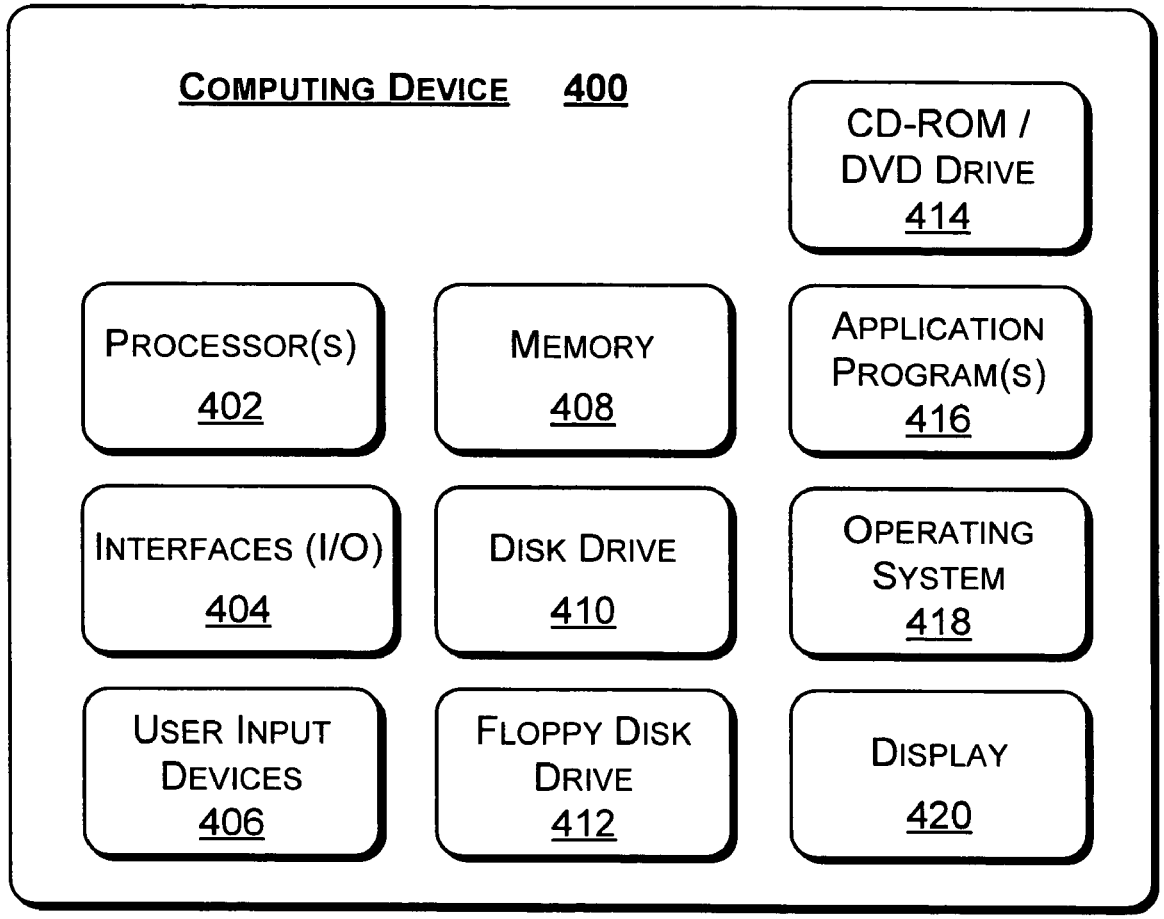
FIG. 4 illustrates various components of an embodiment of a computing device which may be utilized to implement portions of the techniques discussed herein, according to an implementation.

FIG. 4 illustrates various components of an embodiment of a computing device 400 which may be utilized to implement portions of the techniques discussed herein. In one implementation, the computing device 400 can be used to perform the method of FIG. 3. The computing device 400 may also be used to provide access to and/or control of the systems 100 and 200 of FIGS. 1-2A, respectively. The computing device 400 may further be used to manipulate, enhance, and/or store the symbologies discussed herein.

The computing device 400 includes one or more processor(s) 402 (e.g., microprocessors, controllers, etc.), input/output interfaces 404 for the input and/or output of data, and user input devices 406. The processor(s) 402 process various instructions to control the operation of the computing device 400, while the input/output interfaces 404 provide a mechanism for the computing device 400 to communicate with other electronic and computing devices. The user input devices 406 can include a keyboard, touch screen, mouse, pointing device, and/or other mechanisms to interact with, and to input information to the computing device 400.

The computing device 400 may also include a memory 408 (such as read-only memory (ROM) and/or random-access memory (RAM)), a disk drive 410, a floppy disk drive 412, and a compact disk read-only memory (CD-ROM) and/or digital versatile disk (DVD) drive 414, which may provide data storage mechanisms for the computing device 400.

The computing device 400 also includes one or more application program(s) 416 and an operating system 418 which can be stored in non-volatile memory (e.g., the memory 408) and executed on the processor(s) 402 to provide a runtime environment in which the application program(s) 416 can run or execute. The computing device 400 can also include a display device 420, such as a cathode ray tube (CRT), a liquid crystal display (LCD), a digital light projector (DLP), a plasma display panel (PDP), and the like. Also, the display device 420 may be an integrated display device such as for a PDA, a portable computing device, and any other mobile computing device.

Select implementations discussed herein (such as those discussed with reference to FIG. 3) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, some implementations may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or machine-readable media suitable for storing electronic instructions and/or data. Moreover, data discussed herein may be stored in a single database, multiple databases, or otherwise in select forms (such as in a table).

Additionally, some implementations discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
utilizing a display with symbology to determine data corresponding to an object;
determining whether the object is in proximity to the display; and
projecting the symbology if it is determined that the object is in proximity to the display, wherein the symbology is projected by the display for a temporary period.

2. The method of claim 1, wherein the data is selected from a group comprising a position of the object and an orientation of the object.

3. The method of claim 1, wherein the symbology is optically clear for wavelengths of light visible to an unaided human eye.

4. The method of claim 1, wherein the symbology is encoded in a two-dimensional array of markings.

5. The method of claim 1, wherein the object is located over the symbology.

6. The method of claim 1, wherein the symbology is projected serially.

7. The method of claim 1, further comprising the object transmitting the symbology to a decoding device.

8. The method of claim 1, wherein the symbology is encrypted.

9. The method of claim 1, wherein the symbology is present on the display.

10. A system comprising:
a display with symbology; and
a processor and stored instructions, wherein the processor follows the stored instructions to utilize the symbology to determine positioning of an object, proximate the display, in three dimensions.

11. The system of claim 10, further comprising stored instructions to decode the symbology.

12. The system of claim 10, further comprising stored instructions to transmit the symbology to a decoding device.

13. The system of claim 10, further comprising stored instructions to project the symbology.

14. A system comprising:
a display with symbology;
a sensor configured to sense whether an object is in proximity to the display, wherein the symbology is projected proximate to the display if it has been sensed that the object is in proximity to the display; and
the object capable of reading the symbology to determine data corresponding to the object.

15. The system of claim 14, wherein the data is selected from a group comprising a position of the object and an orientation of the object.

16. The system of claim 14, wherein the symbology is optically clear for wavelengths of light visible to an unaided human eye.

17. The system of claim 14, wherein the object comprises a sensor to read the symbology.

18. The system of claim 14, wherein the display is selected from a group comprising a cathode ray tube (CRT), a liquid crystal display (LCD), a digital light projector (DLP), and a plasma display panel (PDP).

19. An apparatus comprising:
a display surface that is at least one of stretchable or compressible, the surface including symbology;
a device to read the symbology from the display surface; and
logic to determine elevational changes of an object from the symbology.

20. The apparatus of claim 19, wherein the logic is external to the object.

21. The apparatus of claim 19, wherein the logic is embedded in the object.

22. The apparatus of claim 19, wherein the device is selected from a group comprising a charge-coupled device and a complimentary metal-oxide semiconductor sensor.

23. The apparatus of claim 19, further comprising a light source, selected from a group comprising an infrared light source and an ultraviolet light source, to illuminate the symbology.

24. The apparatus of claim 19, wherein the logic is configured to track movement of the object in three dimensions based upon the symbology read from the display.

25. An apparatus comprising:
a display surface configured to support an object on a first side of the display surface;
a projector on a second side of the display surface configured to project at least one image onto the display surface;
symbology provided on the display surface;
at least one camera on the second side of the display surface configured to capture images of those portions of the symbology over which the object rests; and
a computing device configured to identify those portions of the symbology over which the object rests based upon the captured images and to determine data corresponding to the object based upon the identified portions of the symbology.

26. The apparatus of claim 25, wherein the data is selected from a group comprising a position of the object and an orientation of the object.

27. The apparatus of claim 25, wherein the symbology is optically clear for wavelengths of light visible to an unaided human eye.

28. The apparatus of claim 25, wherein the symbology is encoded in a two-dimensional array of markings.

29. The apparatus of claim 25, wherein the symbology is on a display overlay.

30. The apparatus of claim 25, wherein the symbology comprises markings selected from a group comprising prints, patches, embossments, projections, and machinings formed on the display surface.

31. The apparatus of claim 25, wherein the symbology is formed from ink selected from a group comprising an infrared reflective ink and an ultraviolet fluorescing ink.

32. The apparatus of claim 25 further comprising the object, wherein the object is located over the symbology.

33. The apparatus of claim 25, wherein the controller is configured to generate control signals directing the projector to project the symbology on to display surface.

* * * * *

UNITED STATES PATENT AND TRADEMARK OFFICE
CERTIFICATE OF CORRECTION

PATENT NO. : 7,571,855 B2 Page 1 of 1
APPLICATION NO. : 11/092534
DATED : August 11, 2009
INVENTOR(S) : Jeffrey Thielman et al.

It is certified that error appears in the above-identified patent and that said Letters Patent is hereby corrected as shown below:

In column 3, line 46, delete "visible the" and insert -- visible to the --, therefor.

Signed and Sealed this

Twentieth Day of April, 2010

David J. Kappos
*Director of the United States Patent and Trademark Office*